(12) United States Patent
Visuri et al.

(10) Patent No.: US 8,331,252 B2
(45) Date of Patent: Dec. 11, 2012

(54) APPARATUS, METHOD AND COMPUTER PROGRAM PRODUCT FOR SIGNALING MODULATION AND CODING SCHEME

(75) Inventors: Jaakko Eero Samuli Visuri, Helsinki (FI); Klaus Hugl, Helsinki (FI); Olav Tirkkonen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 12/525,283

(22) PCT Filed: Jan. 31, 2008

(86) PCT No.: PCT/IB2008/050375
§ 371 (c)(1),
(2), (4) Date: Jul. 12, 2010

(87) PCT Pub. No.: WO2008/093298
PCT Pub. Date: Aug. 7, 2008

(65) Prior Publication Data
US 2010/0303052 A1    Dec. 2, 2010

Related U.S. Application Data

(60) Provisional application No. 60/898,831, filed on Jan. 31, 2007.

(51) Int. Cl.
*H04L 12/56* (2006.01)
*H04J 1/16* (2006.01)
(52) U.S. Cl. .................. 370/252; 370/278; 370/329
(58) Field of Classification Search .......... 370/252, 370/328, 329, 278
See application file for complete search history.

(56) References Cited

U.S. PATENT DOCUMENTS

| 6,310,923 B1 | 10/2001 | Lee et al. |
| 6,563,884 B1 * | 5/2003 | Nikula ................... 375/295 |
| 2008/0049662 A1 * | 2/2008 | Islam et al. ............... 370/328 |

FOREIGN PATENT DOCUMENTS

EP    1289179 A    3/2003
(Continued)

OTHER PUBLICATIONS

Office Action from Korean Patent Application No. 10-2009-7017983, dated Dec. 24, 2010, 4 pages.
(Continued)

*Primary Examiner* — John Pezzlo
(74) *Attorney, Agent, or Firm* — Nokia Corporation (57) ABSTRACT

A first parameter such as an indicator of modulation and coding scheme MCS for a first shared channel SCH codeword and a second parameter for a second SCH codeword are determined. From a locally stored mapping rule a bit sequence that explicitly indicates the first parameter and that implicitly indicates the second parameter is chosen, and a first control channel CCH codeword is transmitted with the explicit bit sequence that explicitly indicates the first parameter for the first SCH codeword and a second CCH codeword is sent companion to the first CCH codeword, wherein the second parameter for the second SCH codeword is implicitly indicated by the explicit bit sequence of the first CCH codeword. The receiving party determines the second parameter by its own locally stored mapping rule, and an indicator in each CCH codeword may be used to inform the receiver that the two (or more) CCH codewords are associated with one another and to use its mapping rule to determine the second parameter.

20 Claims, 6 Drawing Sheets

FOREIGN PATENT DOCUMENTS

WO            2006105333 A     10/2006

OTHER PUBLICATIONS

International Search Report and Written Opinion of the International Searching Authority from PCT Application No. PCT/IB2008/050375, dated Aug. 12, 2008, 14 pages.

"Adaptive Signalling of CQI Report", 3GPP TSG-RAN WG1 Meeting #24, No. R1-020245, Feb. 18, 2002.

"Compairson of Channel Quality Reporting Schemes", 3GPP TSG-RAN WG1 Meeting #23, No. R1-020152, Jan. 8, 2002.

Office action received for corresponding Chinese Application No. 200880007586.7 dated May 10, 2012, 6 pages of Office Action, and 11 pages of Office action translation.

Office Action received for corresponding Singapore Patent Application No. 200905109.5, dated May 8, 2012, 7 pages.

Office Action received for corresponding Korean Patent Application No. 2009-7017983, dated Aug. 26, 2011, 3 pages of office action & 2 pages of office action translation.

International Preliminary Report on Patentability received for corresponding Patent Cooperation Treaty Application No. PCT/IB2008/050375, dated Aug. 4, 2009, 7 pages.

"3rd Generation Partnership Project; Technical Specification Group Radio Access Network; Evolved Universal Terrestrial Radio Access (E-UTRA); Physical layer procedures (Release 8)", 3GPP TS 36.213 v8.3.0, May 2008, pp. 1-45.

Substantive Examination Report received for corresponding Indian Patent Applicaiton No. W-00200902103, 2 pages.

* cited by examiner

| | For 1st receiver type/UE class | For 2nd receiver type/UE class |
|---|---|---|
| If CW1 modulation=A | CW2 modulation =B | CW2 modulation=B |
| If CW1 modulation=B | CW2 modulation =B | CW2 modulation=D |
| If CW1 modulation=C | CW2 modulation =A | CW2 modulation=C |
| If CW1 modulation=D | CW2 modulation =B | CW2 modulation=C |

312  314  316

320

| | For 1st receiver type/UE class | For 2nd receiver type/UE class |
|---|---|---|
| CW1 rate/block length=#1 | CW2 rate/block length=#3 | CW2 rate/block length=#17 |
| CW2 rate/block length=#2 | CW2 rate/block length=#3 | CW2 rate/block length=#25 |
| CW2 rate/block length=#3 | CW2 rate/block length=#1 | CW2 rate/block length=#9 |
| CW2 rate/block length=#4 | CW2 rate/block length=#24 | CW2 rate/block length=#24 |
| ... | ... | ... |
| CW2 rate/block length=#32 | CW2 rate/block length=#12 | CW2 rate/block length=#5 |

APPARATUS, METHOD AND COMPUTER PROGRAM PRODUCT FOR SIGNALING MODULATION AND CODING SCHEME

RELATED APPLICATION

This application was originally filed as PCT Application No. PCT/IB2008/050375 filed on Jan. 31, 2008 and claims priority to U.S. Application No. 60/898,831 filed on Jan. 31, 2007.

TECHNICAL FIELD

The exemplary and non-limiting embodiments of this invention relate generally to wireless communication systems, methods, devices and computer program products and, more specifically, relate to control signaling between multi-antenna base station and multiple antennas at the user ends, such as the evolved UTRAN (E-UTRAN/LTE, sometimes termed 3.9G) being standardized in 3GPP long term evolution.

BACKGROUND

In 3GPP (Third Generation Partnership Project), it has been agreed that downlink multiantenna transmission for the long term evolution LTE of 3GPP (sometimes termed 3.9G) supports up to two codewords (CW) or streams (a stream can be as little as a single data codeword on the downlink shared channel), so that a downlink shared channel transmission to the user equipment UE in a multi-antenna system (e.g., four antennas each at the base station BS and the user equipment UE) may use two different transmission formats, one for each DL shared channel codeword. The used shared channel transmission formats used on all shared channel codewords transmitted to the UE need to be indicated to the UE, typically on a control channel. This can be interpreted in the way that there are multiple codewords transmitted on the control channel, one for each of the shared channel codewords. Term these control channel codewords. Each of these control channel codewords carries information about a corresponding shared channel codeword. Each control channel codeword indicates to the UE the transmission format that has been or will be used in transmission to the UE on a particular physical resource allocation. Within each of these control channel codewords are indications of modulation and channel coding rate (or equivalently transport block size/codeblock length). In the wireless communications art, modulation and coding rate/codeblock length are termed together as a modulation and coding rate set MCS. Assume for example that two bits are needed to indicate the modulation type allocated by the network to a UE, and five bits are needed to indicate the coding rate allocated by the network to that same UE in that same allocation. The MCS would then be seven bits long. For the case where there are two control channel codewords for a single allocation of network physical resources (e.g., one or more physical resource blocks allocated in a single network grant to one UE), each control channel codeword carries seven bits for MCS. Since the bit rate of the control channel should be kept as minimal as possible, it is desirable to minimize the overhead from these control channel codewords.

Also, the UE may transmit channel quality information (CQI) on an uplink control channel related to a possible DL transmission format with multiple shared channel codewords. In that case, the CQI reporting can be interpreted to consist of several UL control channel codewords, one for each of the DL shared channel codewords.

SUMMARY

According to an embodiment of the invention is a method that includes determining a first parameter for a first shared channel codeword and a second parameter for a second shared channel codeword; determining from a locally stored mapping rule a bit sequence that explicitly indicates the first parameter and that implicitly indicates the second parameter; and sending a first control channel codeword with the bit sequence that explicitly indicates the first parameter for the first shared channel codeword and sending a second control channel codeword companion to the first control channel codeword, wherein the second parameter for the second shared channel codeword is implicitly indicated by the bit sequence that is explicit in the first control channel codeword.

According to another embodiment of the invention is a memory embodying a program of machine-readable instructions executable by a digital data processor to perform actions directed toward sending codewords. According to this embodiment, the actions include determining a first parameter for a first shared channel codeword and a second parameter for a second shared channel codeword; determining from a locally stored mapping rule a bit sequence that explicitly indicates the first parameter and that implicitly indicates the second parameter; and sending a first control channel codeword with the bit sequence that explicitly indicates the first parameter for the first shared channel codeword and sending a second control channel codeword companion to the first control channel codeword, wherein the second parameter for the second shared channel codeword is implicitly indicated by the bit sequence that is explicit in the first control channel codeword.

According to another embodiment of the invention is an apparatus that includes a processor, a memory and a transmitter. The processor is configured to determine a first parameter for a first shared channel codeword and a second parameter for a second shared channel codeword. The memory is configured to store a mapping rule that maps a bit sequence that explicitly indicates a first parameter to a second parameter. The processor is also configured then to determine the bit sequence from the memory based on the determined first and second parameters. The transmitter is configured to send a first control channel codeword with the bit sequence that explicitly indicates the first parameter for the first shared channel codeword, and to send a second control channel codeword companion to the first control channel codeword, wherein the second parameter for eh second shared channel codeword is implicitly indicated by the bit sequence that is explicit in the first control channel codeword.

In particular embodiments of this apparatus, the second control channel codeword is shorter than the first control channel codeword by the length of the explicit bit sequence, and/or each of the first and second control channel codewords comprise a transmission mode indicator that indicates the first and second control channel codewords are companion to one another, and/or the transmission mode indicator further indicates a multi-antenna transmission mode according to the locally stored mapping rule, and/or the first parameter is a first modulation and coding rate set for a first physical resource block that is allocated by the first control channel codeword and over which the first shared channel codeword is sent, and the second parameter is a second modulation and coding rate set for a second physical resource block that is allocated by the second control channel codeword and over which the second shared channel codeword is sent, and the apparatus comprises a Node B and the parameters further indicate length of the respective physical resource blocks, or the parameters are channel quality indicators.

According to another embodiment of the invention is an apparatus that includes processing means for determining a first parameter for a first shared channel codeword and a second parameter for a second shared channel codeword; storage means for storing a mapping rule that maps a bit sequence that explicitly indicates a first parameter to a second parameter, where the processing means further is for determining the bit sequence from the storage means based on the determined first and second parameters. The apparatus further includes sending means for sending a first control channel codeword with the bit sequence that explicitly indicates the first parameter for the first shared channel codeword, and for sending the second control channel codeword companion to the first control channel codeword, and wherein the second parameter for the second shared codeword is implicitly indicated by the bit sequence that is explicit in the first control channel codeword.

In a particular embodiment of this apparatus, the processing means includes a microprocessor, the storage means includes a local memory of the apparatus that is readable by the microprocessor, and the sending means includes a wireless transmitter. Further in this particular embodiment, of which the apparatus is a Node B, each of the first and second control channel codewords include a transmission mode indicator that indicates the first and second control channel codewords are companion to one another, the first parameter is a first modulation and coding rate set for a first physical resource block that is allocated by the first control channel codeword and over whirl the first shared channel codeword is sent, and the second parameter is a second modulation and coding rate set for a second physical resource block that is allocated by the second control channel codeword and over which the second shared channel codeword is sent.

According to another embodiment of the invention is a method that includes receiving a first control channel codeword that comprises a bit sequence in a predetermined position, and receiving a second control channel codeword companion to the first control channel codeword that does not have a bit sequence in the predetermined position. From a locally stored mapping rule it is determined that the bit sequence explicitly indicates a first parameter for a first shared channel codeword, and that the bit sequence implicitly indicates a second parameter for a second shared channel codeword. Thereafter, some action is taken on the first shared channel codeword according to the first parameter and on the second shared channel codeword according to the second parameter.

According to another embodiment of the invention is an apparatus that includes a receiver, a memory and a processor. The receiver is configured to receive a first control channel codeword that has a bit sequence in a predetermined position and to receive a second channel codeword companion to the first control channel codeword that does not have a bit sequence in the predetermined position. The memory is configured to store a mapping rule associating the bit sequence to a first parameter and to a second parameter. The processor is configured to determine from the mapping rule that the bit sequence explicitly indicates the first parameter for a first shared channel codeword, and that the bit sequence implicitly indicates the second parameter for a second shared channel codeword. The processor is further configured to take action on the first shared channel codeword according to the first parameter and on the second shared channel codeword according to the second parameter.

These and other aspects are detailed with particularity below.

BRIEF DESCRIPTION OF THE DRAWINGS

The detailed description below is in reference to the following attached Drawing

DETAILED DESCRIPTION

The current assumption in 3GPP is that for each control channel codeword bearing MCS information, the signaling of the applied MCS is to be signaled independently. This results in double the signaling overhead as compared to single codeword/stream transmission. The inventors have determined an approach that removes the need to explicitly signal the MCS for the second control channel codeword by using a pre-defined mapping rule to map the selected modulation and coding of the first shared channel codeword (which is explicitly signaled in a control channel codeword) to the MCS of the second shared channel codeword (which is not explicitly signaled in a control channel codeword). As will be detailed below, the principles in how this is accomplished may also be extended to other control signaling to reduce overhead, such as channel quality indications CQI or other control signaling wherein bits of one codeword are related to information relevant to another related codeword in a known manner that may be predetermined and stored locally at the entity receiving the codewords. While the specific examples detailed herein are within the context of LTE, the codeword association regimen and signaling concepts detailed herein are not limited only to LTE; these teachings may be used to advantage in any wireless or even wired network to signal implicitly parameters such as modulation and coding scheme for a second (and also a third, fourth etc.) shared channel codeword by explicit signalling in a first control channel codeword, where the first control codeword is associated with the other control channel codewords and the explicit-implicit relation of the parameters follows a locally stored mapping rule.

Figure 1:
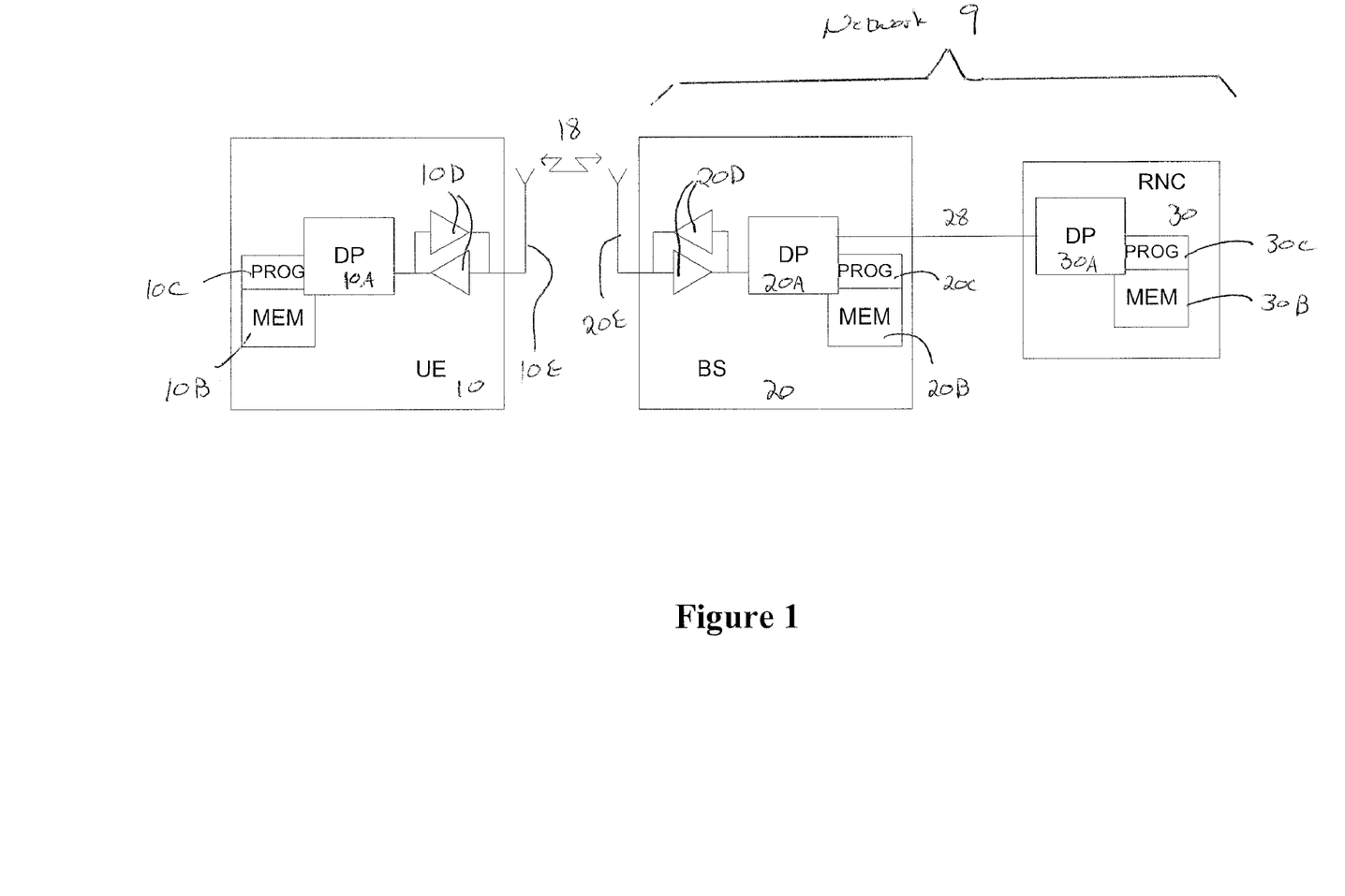
FIG. 1 shows a simplified block diagram of various electronic devices that are suitable for use in practicing the exemplary embodiments of this invention.

Prior to detailing such embodiments, reference is made first to FIG. 1 for illustrating a simplified block diagram of various electronic devices that are suitable for use in practicing the exemplary embodiments of this invention. In FIG. 1 a wireless network 9 is adapted for communication with a UE 10 via a NodeB 20 (base station BS) over a wireless link 18.

The link 18 in certain embodiments may be a downlink control channel DCCH or scheduling channel SCH, an uplink control (feedback/CQI) channel UCCH, or a data channel (e.g., dedicated channel DCH or packet data channel PDCH) for use by the UE 10 as authorized by the codewords detailed herein. Only one link 18 is illustrated for clarity of illustration but it will be seen below that different channels are used for different aspects of the invention, and any of those specific channels are not generally bi-directional. The NodeB may be an E-NodeB (Evolved NodeB) as contemplated under E-UT-RAN (evolved Universal Terrestrial Access Network). The network 9 includes a node higher than the NodeB, generally termed an RNC 30, that controls the NodeB 20 through an Iub interface 28. The RNC 30 may control multiple NodeBs, of which only one is shown in FIG. 1. The Iub interface 28 may be wired or wireless, and relay nodes (not shown) may also be present between the NodeB 20 and the UE 10, such as where the network 9 is a mesh network with fixed and/or mobile relay nodes. The RNC 30 is coupled to a core network (not shown, typically a mobile switching center MSC or a Serving GPRS Support Node SGSN) through an Iu interface. Generally, embodiments of the invention will lie in the NodeB 20 and the UE 10, though in some cases the RNC 30 may perform some functions detailed below for the NodeB without departing from the teachings herein.

The RNC 30 includes a data processor (DP) 30A, a memory (MEM) 30B that stores a program (PROG) 30C, and a modem (not shown) for modulating and demodulating messages sent and received over the Iu interface and the Iub interface 28. Similarly, the NodeB 20 includes a DP 20A and a MEM 20B that stores a PROG 20C. The NodeB 20 also includes a modem (not shown) for communicating with its respective RNC 30 over the Iub interface 28, and also a suitable radiofrequency RF transceiver 20D coupled to one or more antennas 20E for wireless bidirectional communication at a suitable RF, such as with the UE over the link 18. The UE 10 also includes a DP 10A, a MEM 10B for storing a PROG 10C, and a wireless transceiver 10D coupled to one or more antennas 10E. The NodeB 20 and/or the UE 10 may include more than one transceiver 20D/10D, each coupled selectively to one or more antennas 20E/10E for multi-antenna transmission and reception. At least the PROGs 10C & 20C, and in some embodiments also 30C, are assumed to include program instructions that, when executed by the associated DP, enable the electronic device to operate in accordance with the exemplary embodiments of this invention, as will be discussed below in greater detail.

Certain of the exemplary embodiments of this invention may be implemented at least in part by computer software executable by the DP 10A/20A of the UE 10/NodeB 20, or by hardware, or by a combination of software and hardware. In some embodiments, the computer software or hardware or combination of software and hardware is in the RNC 30, and the NodeB 20 acts as a passthrough of the control words or mapping rules detailed herein between the RNC 30 and the UE 10. Generally though, the evolution of 3.9G is toward increased functionality on the NodeB 20 but some examples below infer mapping rules generated higher in the network than the NodeB 20.

The various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wheless communication capabilities, music storage and playback appliances having wireless communication capabilities, Internet appliances permitting wireless Internet access and browsing, as well as portable units or terminals that incorporate combinations of such functions.

The MEMs 10B, 20B and 30B may be of any type suitable to the local technical environment and may be implemented using any suitable data storage technology, such as semiconductor-based memory devices, magnetic memory devices and systems, optical memory devices and systems, fixed memory and removable memory. The DPs 10A, 20A and 30A may be of any type suitable to the local technical environment, and may include one or more of general purpose computers, special purpose computers, microprocessors, digital signal processors (DSPs) and processors based on a multi-core processor architecture, as non-limiting examples.

Figure 2:
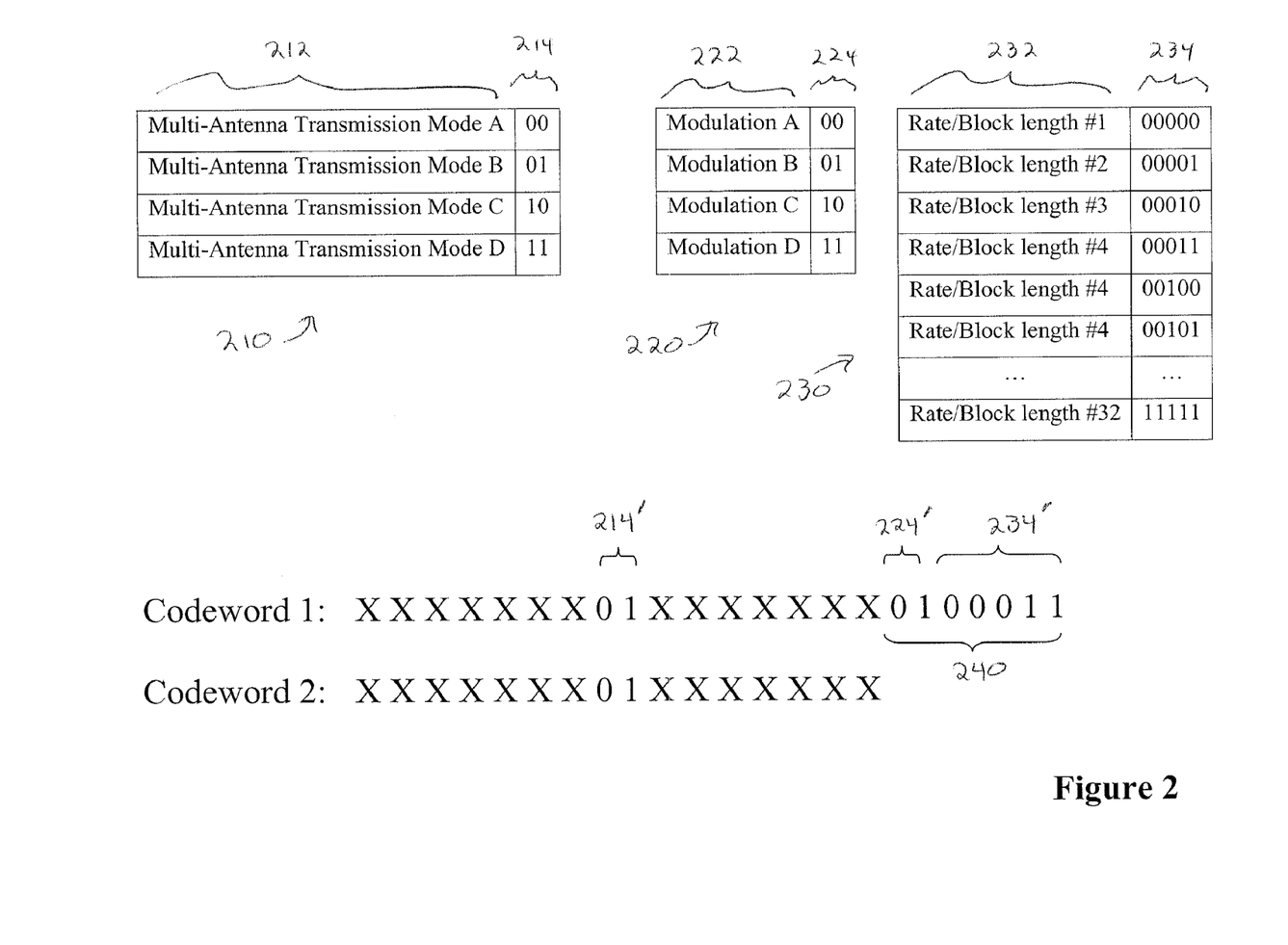
FIG. 2 illustrates tables for bit indications of transmission mode, modulation, and coding rate/block length, and also two control channel codewords carrying MCS information in a different manner according to an embodiment of the invention.

Now are described particular embodiments of the invention, using as an example the control channel codeword that carries MCS information for a shared channel codeword. Assume that two bits are used to indicate the modulation format, five bits are used for indicating the channel coding rate, and two bits are used to indicate the multi-antenna transmission mode (e.g., to choose between diversity mode and spatial multiplexing modes of different rank in a 4-transmission antenna by 4-reception antenna case). Shown in FIG. 2 are three tables indicating bit sequences used to indicate the above information. At the left of FIG. 2, a transmission mode table 210 shows multi-antenna transmission modes A, B, C and D (ref. no. 212), which will be indicated in the control channel codeword sent from the NodeB 20 to the UE 10 as respective bit sequences 00, 01, 10 and 11 (ref. no. 214). At the center of FIG. 2 is a modulation table 220 of modulation formats A, B, C and D (ref no. 222), also indicated in the control channel codeword by the two-bit sequence (ref. no. 224) indicated in that table. Exemplary modulation formats include QPSK (quadrature phase shift keying), OQPSK (offset-QPSK), 16QAM (quadrature amplitude modulation), 32-QAM, and other modulations known in the wireless communication arts. At the right of FIG. 2 is an abbreviated rate table 230 of coding rates 232 and five-bit sequences 234 indicating each of the coding rates 232 for the shared channel codewords. It is understood that the modulation table 220 and rate table 230 shown separately in FIG. 2 may be stored locally in each of the NodeB 20 and UE 10 as a single table, as a list, as separate lists, as an algorithm to generate the information shown in those tables, or other manner of storing the information shown there.

The first control channel codeword, codeword 1 in FIG. 2, carries a series of bits, some of which are of interest to this invention. Other bits of that control channel codeword, marked as X in FIG. 2, may for example inform the UE 10 of the physical resource block that it is being allocated over which the related shared channel codeword(s) will be sent, and/or possibly data related to Hybrid ARQ transmissions and may be generated and signaled as is currently done in the art without adaptation by embodiments of this invention. Control channel codeword 1 of FIG. 1 is also shown to include the two-bit sequence (01) of transmission mode 214' taken from the transmission mode table 210. This indicates to the UE 10 that there is a second control channel codeword companion to the first control channel codeword, to enable diversity or spatial multiplexing as noted above. The first control channel codeword also carries a sequence of MCS bits 240 for indicating the modulation and coding rate for the allocation of the (first) shared channel codeword to which it relates. The MCS bits 240 include the two-bit sequence 224' (01) taken from the modulation table 220 to indicate modulation, and the five-bit sequence 234' (00011) taken from the rate table 230 to indicate coding rate (or codeblock length) for the related shared channel codeword.

In the prior art, the second control channel codeword would be generated in an identical manner to the first control channel codeword, and would carry a sequence of MCS bits identical in length to the MCS bits 240 of the first control channel codeword. In the example given, there would then be seven MCS bits in the first control channel codeword and seven MCS bits in the second control channel codeword, each indicating modulation and coding rate for the diversity/spatial multiplexed portion of the shared channel transmission which these control channel codewords authorize. In some embodiments, the transmission mode bits 214' need not be repeated in the second control channel codeword.

Embodiments of this invention eliminate from the second control channel codeword those seven MCS bits that the prior art would place in it. Because these codewords are sent on a control channel, and because at least in 3.9G the allocations of physical resource blocks are sent each OFDM symbol (0.5 msec) to every UE 10 that is allocated resources, eliminating the MCS bits 240 from one of the control channel codewords on each multi-codeword allocation results in a bandwidth savings that accumulates to an appreciable amount.

The MCS bits relevant for the shared channel transmission authorized by the second control channel need not be included in the second control channel codeword itself because an embodiment of this invention uses a pre-defined mapping rule to map the selected modulation and coding that is explicit in the first control channel codeword as the MCS bits 240 to the modulation and coding of the second shared channel codeword that in the prior art would be normally signaled in the second control channel codeword. MCS of the second shared channel codeword is implicit from the mapping rule and the MCS that is explicit in the first control channel codeword. The NodeB 20 signals the applied MCS of the first shared channel codeword in the MCS bits 240 of the first control channel codeword, and the MCS of the second shared channel codeword is unambiguously given by the MCS of the first control channel codeword and the mapping rule without having to use the same number of bits in the second control channel codeword. This mapping is used and known (locally stored in a MEM 20B/10B) at both the base station 20 and the UE 10. In a first embodiment, the mapping rule can be agreed upon implicitly, so that the result of mapping according to the rule differs depending on the capability of the UE receiver 10D (which can be indicated by the class of the UE 10). In a second embodiment, the mapping rule can be explicitly signaled from the network 9 to the UE 10, such as (a) via higher layer signaling or (b) using system information.

In the first embodiment noted above, the UE class is applied to implicitly signal in the first control channel codeword the MCS of the second shared channel codeword. A UE class can be e.g. linked a specific receiver type that is applied to decode the two codewords. The receiver capability (such as linear minimum mean square error MMSE or successive interference cancellation SIC) of the UE 10 is known by the base station 20 from the UE class, and the base station 20 knows the UE class once the UE 10 is established with the NodeB 20.

Figure 3:
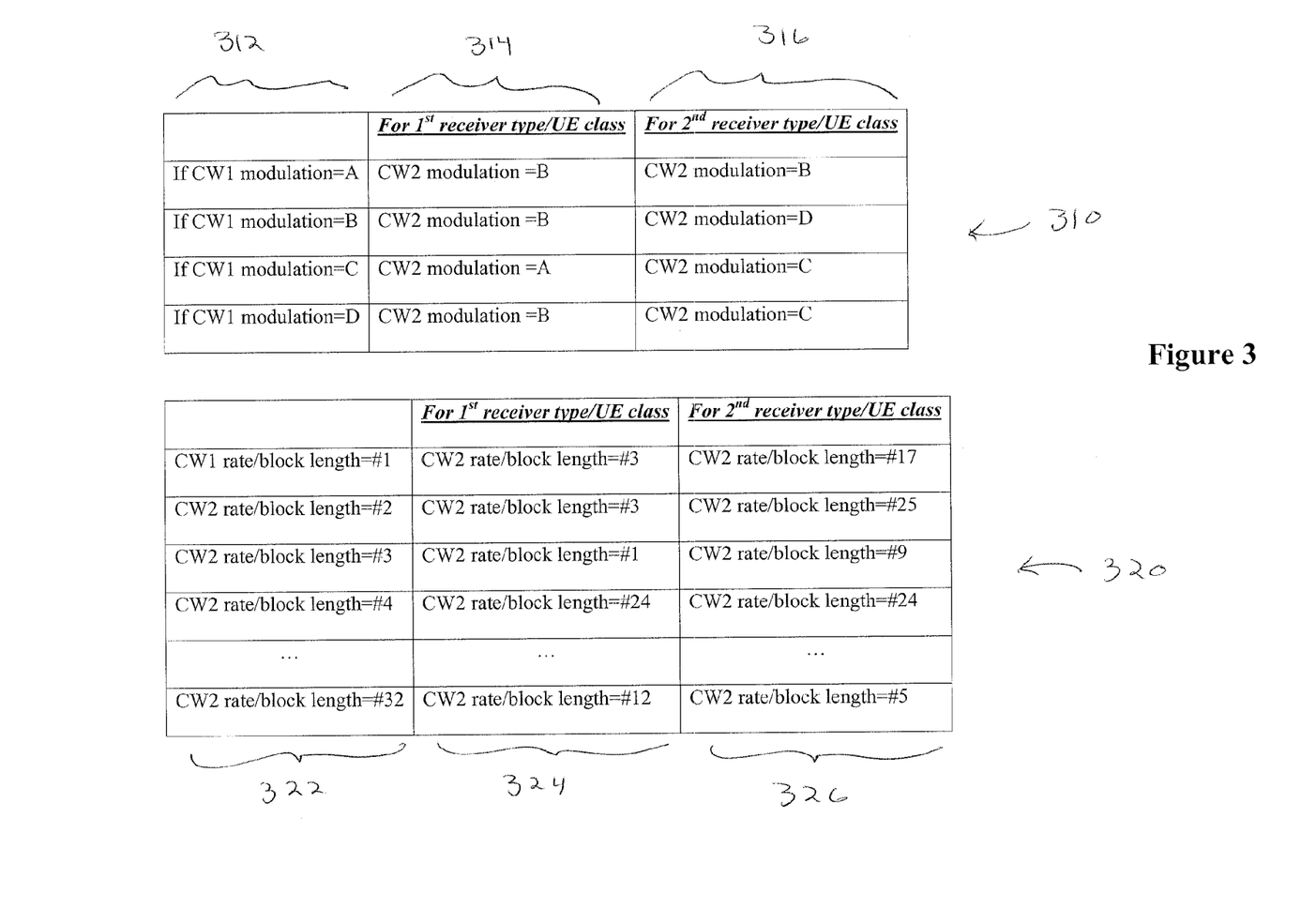
FIG. 3 illustrates locally stored tables that represent mapping rules used for mapping MCS bits from a received first control channel codeword to determine an MCS for a second control channel codeword, according to an exemplary embodiment of the invention.

In the second embodiment, the mapping rule is not pre-defined by the UE class (e.g. receiver type or receiver capability), but instead the UE 10 and/or the NodeB 20 chooses the best mapping rule and signals/negotiates the mapping rule to be applied via higher layer signaling. As will be seen, the mapping table is used to determine at the NodeB 20 which MCS it authorizes in the second shared channel codeword when it generated the MCS bits for the first control channel codeword, and is also used at the UE 10 to determine the MCS for the second shared channel codeword from the MCS bits 240 of the first control channel codeword. FIG. 3 is directed specifically to the first embodiment noted above where different UE class maps to different MCS for the second shared channel codeword.

From the above detailed explanation it is clear that the two-codeword concept may be readily extended to three or more codewords. The first control channel codeword carries the transmission mode indicator 214' or some other bit sequence that indicates which control channel codewords are companion to one another. The first control channel codeword carries also the MCS bit sequence 240 that gives the modulation and coding rate for all of the companion control channel codewords and their related shared channel codewords. Using the tables as given at FIG. 2, the second and third (and any further) shared channel codewords would be restricted to the same modulation and coding rate as the second shared channel codeword. However the principle of two shared channel codewords with different MCS can be readily extended to three or more shared channel codewords each with a different MCS simply by increasing the number of MCS bits 240 carried in the first control channel codeword. The tables of FIG. 2 may correspondingly be expanded so that the modulation bit sequence 224' is extended to 3 or 4 bits so as to indicate with the additional one or two bits the modulation for the third shared channel codeword, and the coding rate bit sequence 234' is extended to six or seven or eight bits so as to indicate with the additional one or two bits of that sequence the codeblock length of the third shared channel codeword. The number of additional bits can be somewhat limited by not enabling every possible triplet of modulation across the three codewords, so for example the third shared channel codeword may be limited to the modulation of either the first or second shared channel codeword by a third bit of the modulation bit sequence 224' explicitly signaled in the first control channel codeword. Similar restrictions can be used to control the additional control bits used to select codeblock length for the third shared channel codeword. The number of control channel codewords that are associated to one another by the transmission mode indicator 214' may be hard-limited by software in each of the e-Node B and the UE by either a fixed number of total control channel codewords or a time range during which second and third and further control channel codewords are received where the range begins with the first control channel codeword. This more readily enables the e-Node B to re-use the same transmission mode indicator bits 214' in a sequential control channel codeword transmission without confusing the UE as to which of two second control channel codewords is associated with which of two first control channel codewords when they all bear the same mode indicator bits 214'.

An example of a mapping rule is shown in FIG. 3 in the form of a mapping table that may be locally stored in a MEM 20B, 10B of the NodeB 20 and of the UE 10. As with FIG. 2, the mapping tables of FIG. 3 are divided into separate maps for modulation and rate though in practice may be combined into one table, and may be implemented as a list (or separate lists) or algorithm (or separate algorithms). The UE 10 decodes the first control channel codeword and determines the MCS bits (and the MCS) for the first shared channel codeword. At the modulation mapping table 310, the proper location 312 (row) is found by using the MCS from the first control channel codeword, specifically the modulation bit sequence 224'. A first column/mapped association 314 to a second shared channel codeword modulation is valid of the UE 10 is of a first class (or has first receiver type), and a second column/mapped association 316 to a second shared codeword codeword modulation is valid if the UE 10 is of a second class (second receiver type).

Similarly for coding rate, the proper location 322 (row) of a rate mapping table 320 is found by using the MCS from the first control channel codeword, specifically the rate bits 234'. This is the coding rate for the first shared channel codeword. A first column/mapped association 324 to a second shared channel codeword rate/codeblock length is valid of the UE 10 is of a first class (or has first receiver type), and a second column/mapped association 326 to a second shared channel codeword rate/codeblock length is valid if the UE 10 is of a second class (second receiver type). The mapping table/rule that is locally stored in the UE 10 need not include the columns for different UE class as is shown in FIG. 3.

Consider an example. The NodeB 20 wants to allocate to a particular UE 10 for diversity transmissions, so chooses transmission mode B (bit sequence 01) from the transmission mode table 210 of FIG. 2, which are shown in Control channel codeword 1 as reference number 214'. This indicates that the NodeB 20 has two control channel codewords with which to send the allocation to the UE 10. The NodeB 20 wants the UE 10 to transmit the first shared channel codeword in a first diversity aspect with modulation C and coding rate #3, and a second shared channel codeword in a second diversity aspect with modulation C and coding rate #9. The NodeB 20 knows that this particular UE 10 is of a second UE class, and therefore has a second receiver type. For the first diversity aspect, the NodeB consults the tables 220 and 230 of FIG. 2, and determines the modulation bits should be 10 for modulation C and the rate bits should be 00010 for coding rate #3. The second diversity aspect unambiguously is given by the mapping tables 310, 320 of FIG. 3. The NodeB 20 sends the control channel codewords to the UE 10 over a control channel, with the first control channel codeword bearing the transmission mode bits 01 and MCS bits 1000010, and the second control channel codeword bearing the matching transmission mode bits 01 in the same position as in the first control channel codeword but no MCS bits (it is arbitrarily chosen for this example that in the MCS bit sequence, two modulation bits are followed by five rate/block length bits).

Now the UE 10 receives both control channel codewords and decodes them. From the transmission mode bits 01 of the first control channel codeword, the UE 10 determines by referencing the mode table 210 that this is a diversity transmission mode using multi-antenna mode B, and therefore also knows that these two control channel codewords are companions to one another. From the seven MCS bits 240 of the first control channel codeword, the UE 10 determines from the modulation table 220 that the two-bit modulation sequence 10 indicates modulation C for the first diversity aspect. The UE 10 also determines from the rate table 230 that the five-bit rate sequence 00010 indicates rate/codeblock length #3 for the first diversity aspect. The UE sends its first shared channel codeword according to that first diversity aspect: modulation C and rate/length #3. Now for the second diversity aspect, there are no MCS bits in the second control channel codeword. The UE 10 enters the modulation mapping table 310 with the two-bit modulation sequence 10 of the first control channel codeword (or its associated rate from the modulation table 220, modulation C), which in FIG. 3 is the third data row. The UE 10 knows that it is of the second UE class, so the mapping result is given in the third column 316 of that table as modulation C. For the rate, the UE enters the rate mapping table 320 with the five-bit rate sequence 00010 from the first control channel codeword (or its associated result from the rate table, #3), and finds the mapped result in the third column 326 that matches the UE class/receiver type to be rate/block length #9. For the second diversity aspect then, the authorized modulation is C and the rate/codeblock length is #9. The UE sends its second shared channel codeword according to that second diversity aspect: modulation C and rate/length #9.

A special case of the above description is where both shared channel codewords are intended to map to the same MCS. In this case implementation is simpler; the MCS bits of the first control channel codeword directly give the MCS of both the first and the second codewords. The mapping rule is equality. Using the same MCS for both shared channel codewords is one aspect of 3.9G currently being contemplated, but absent some mapping as described herein there is no option to indicate different modulation or rate or block length for the granted resource block by the two different control channel codewords; the MCS indicated by the second control channel codeword would always be the same as was explicitly signaled in the first control channel codeword, and in the prior art that signaling would also be explicit in the second control channel codeword.

In an aspect of the invention, there are at least two mapping tables, only one of which is valid at any given time for a particular UE 10. For example, there may be a fixed mapping table by which the MCS of the second shared channel codeword is identical to the MCS of the first shared channel codeword that is indicated explicitly by the first control channel codeword, and a second mapping table defined by either different mapping results due to UE class, higher layer signaling, or system information to render that second table valid. There may be different mapping rules/tables stored locally in the UE 10 and NodeB 20, and the selection of one or the other is based on the specific transmission mode indicated by the mode bits (table 210 of FIG. 2).

In the case where the mapping table is defined (by UE class, higher layer signaling, or System Information), the mapping table can also be taken into account in the channel quality indication CQI signaling on the uplink UL from the UE 10 to the NodeB 20 or RNC 30. Similar as the mapping from MCS explicitly indicated in the first control channel codeword to determine the MCS of the second shared channel codeword as detailed above, CQI signaling of the received second shared channel codeword can be reduced on the UL reporting in the same way that we save by implicitly signaling in the first control channel codeword the MCS of the second shared codeword on the downlink DL. In this case, CQI of the received first shared channel codeword is signaled on the uplink direction explicitly, and the CQI of the received second shared channel codeword is given by a pre-defined mapping table/rule and the CQI of the received first shared channel codeword. The mapping rule/table is implemented in much the same way as detailed above for MCS, except that it is applied in the uplink signaling direction instead of downlink, and relates to CQI instead of MCS. It will be apparent that the explicit teachings above with reference to MCS can readily be extended to CQI mapping for the uplink.

Figure 4:
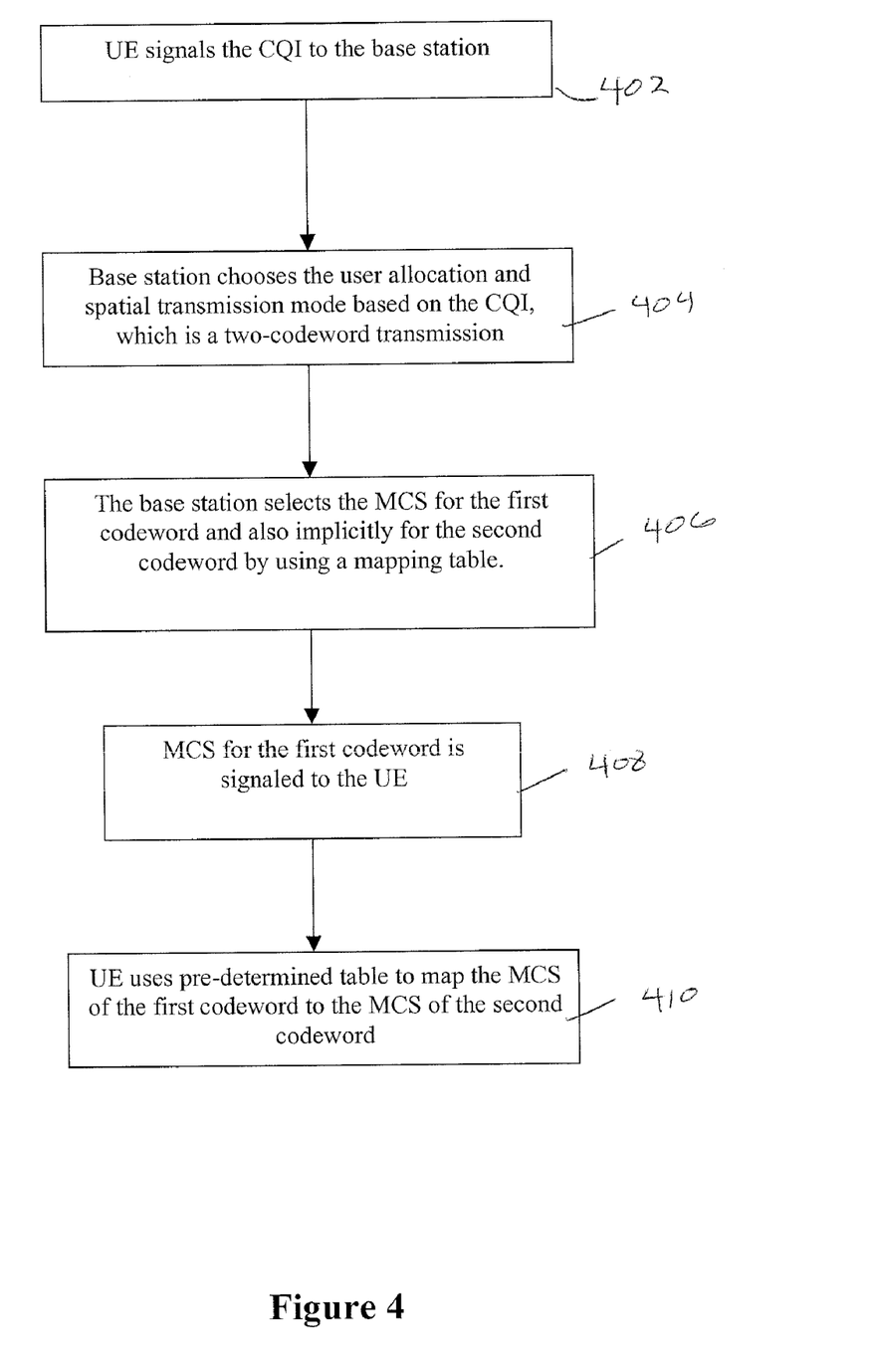
FIG. 4 is a flow diagram showing steps for implementing an aspect of the invention between a NodeB/Base Station and a User Equipment as detailed in FIG. 1.

Following is another example given with reference to FIG. 4.

UE signals the CQI to the base station 402.

Base station chooses the user allocation and spatial transmission mode based on the CQI 404. If two-shared channel codeword transmission is to be used, the base station selects 406 the MCS for the first shared channel codeword and also implicitly for the second shared channel codeword by using a mapping table. The mapping table might be dependent on the used spatial multiplexing mode. The MCS selection is done in such a way that certain predetermined performance criterion is maximized.

MCS for the first shared channel codeword is signaled to the UE 408 (together with indication of the spatial transmission mode used) explicitly in the first control channel codeword.

UE uses pre-determined table to map the MCS that is explicitly signaled in the first control channel codeword to the MCS of the second shared channel codeword (depending on the used spatial transmission mode) 410.

Related to the adaptation of the mapping rule in the second implementation noted above (higher layer signaling or System Information), the following alternatives might be considered:

The base station may use other information than the UE class and/or the CQI information to determine the mapping used. In the System Information version, it would be particularly advantageous to determine the mapping based on the queuing situation in the cell (the NodeB's load of UEs requesting resources). In low load, the base station may use a more conservative mapping, so that the UE is assumed to receive its data with less retransmissions (and less interference generated to the network). In high load, capacity benefits from HARQ could be materialized by applying a more aggressive mapping. In the higher layer signaling case, the base station may use the quality of service QoS requirements of the UE to determine the mapping—for service classes with tighter delay requirements a more conservative mapping could be used than for service classes with more lenient delay requirements.

Furthermore, in the higher layer signaling case the base station may estimate the degree of correlation between his transmission antennas from UL measurements of the UE—the strength of the received correlation in UL is correlated with the strength of the transmit correlation in DL. Knowledge of the transmit correlation allows the base station to construct an estimate of the rank of the DL MIMO (multiple input/multiple output) channel of the UE, which may be used to select an appropriate mapping to be used. Note that the transmit-antenna correlation is a long term property of the channel, so the resulting mapping is a slowly changing quantity which may well be transmitted using higher layer signaling. Note also that the base station may use knowledge of the UE class to estimate the correlation of receive-antennas in DL.

A further alternative is that the UE provides the base station with a measurement indicating the rank of the DL channel, which the base station uses to determine which mapping table to make valid (or which mapping table to download to the UE in the case where the UE does not yet have the specific table locally stored yet). This measurement is preferably based on a long term correlation measurement. This alternative applies both in an implicit manner or in an explicit manner. If the agreement is implicit, the base station determines the mapping uniquely from UE characteristics and data that the UE has provided—the CQI and the indicative rank measurement. The UE knows what he has transmitted to the base station, and interprets the transport format indication accordingly. In this case it is beneficial if the UL feedback is protected so that either the base station and the UE have the same understanding of the mapping table used, or the base station knows that the feedback was wrong and reacts accordingly. Alternatively, blind estimation of the mapping table may be used at the UE. If the agreement of the mapping table is explicit, the base station signals the used mapping table to the UE.

Based on the foregoing it should be apparent that the exemplary embodiments of this invention provide in one embodiment a method, apparatus and computer program product(s) to signal in a first control channel codeword a bit sequence that explicitly indicates parameters for a first shared channel codeword and that implicitly indicate, via a predetermined mapping rule locally stored at the sender and receiver of the codewords, parameters for a second shared channel codeword that is companion to the first shared channel codeword. In an embodiment, the first control channel codeword has another bit sequence that indicates that a second control channel codeword is companion. In another embodiment, the mapping rule is downloaded to the UE from a NodeB, locally stored at the UE and at the NodeB, and used repeatedly for pairs of companion control channel codewords. In a particular aspect, there are multiple locally stored mapping rules, of which only one is valid at any given time for a UE. In an embodiment, results of the mapping rule are contingent on a UE class (at least for the mapping rule stored at the NodeB). In another embodiment, the mapping rule is changed by System Information or signaling from higher in the network than the NodeB. In another embodiment, the parameter is modulation and coding set. In another embodiment, the parameter is channel quality information.

Figure 5:
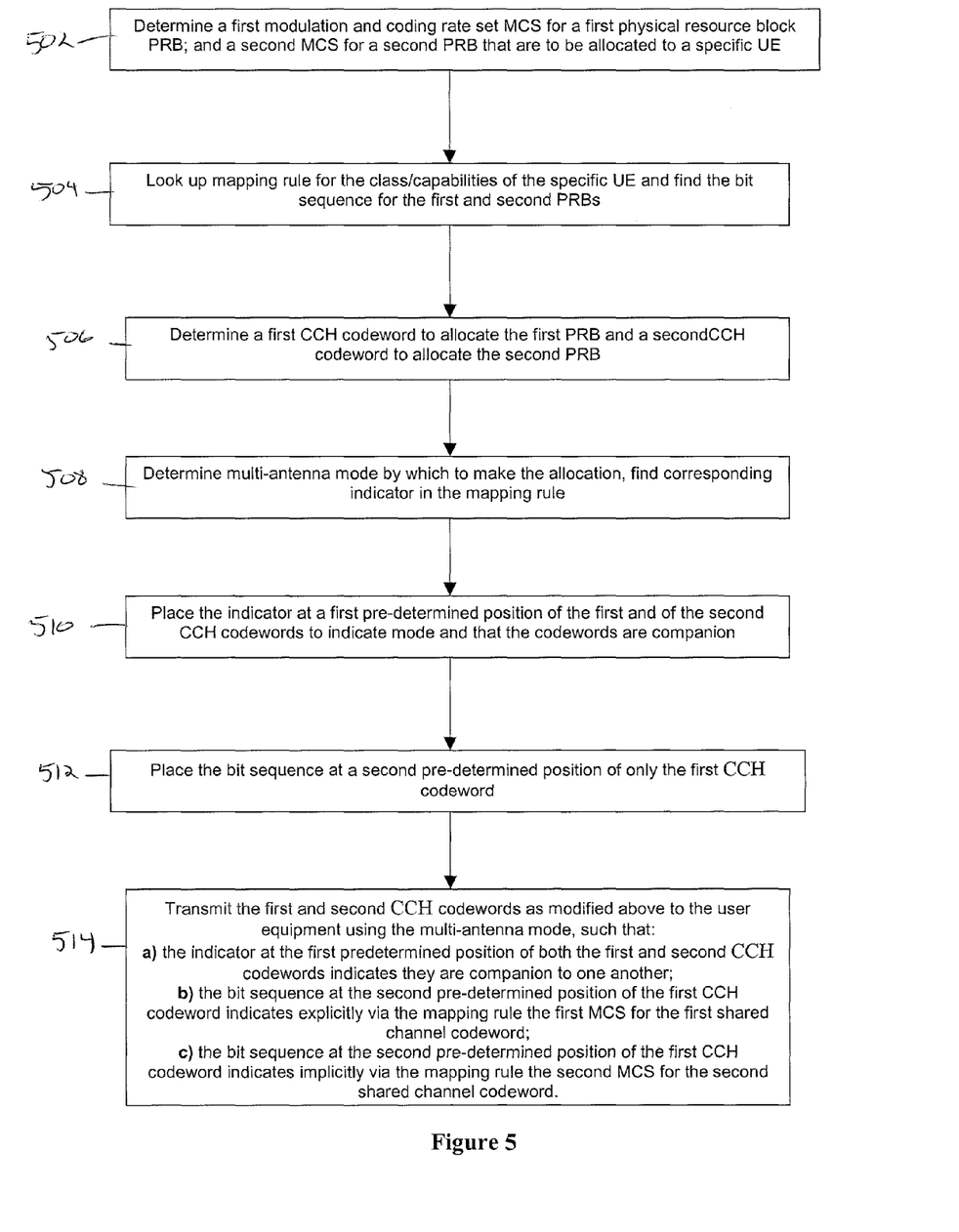
FIG. 5 is a process flow diagram showing embodiments of the invention from the perspective of the party sending the codewords.

The perspective of the party sending the codewords are detailed by example at FIG. 5 for an embodiment of the invention noted above where the Node B sends a resource allocation. With minor modification it can be adapted for the case where the UE sends CQI, also noted above. At block 502 the Node B determines a first modulation and coding rate set MCS for a first physical resource block PRB it is going to allocate to a specific UE, and also determines a second MCS for a second PRB that the Node B is going to allocate to the UE. The Node B then looks up the mapping rule at block 504, for the class/capabilities of the UE to which the PRBs are to be allocated, and finds the bit sequence for the first and second PRBs. At block 506 the Node B then determines a first (control channel) codeword to allocate the first PRB and a second (control channel) codeword to allocate the second PRB, and at block 508 the Node B determines the multi-antenna mode for the allocation and finds an indicator for that multi-antenna mode (e.g., the mapping rule where it is considered as encompassing the transmission mode table 210). The Node B then at block 510 places the multi-antenna mode indicator at a first pre-determined position (e.g., position of 214' of FIG. 2) of the first and of the second codewords to indicate mode and that the codewords are companion to one another. At block 512 the Node B places the bit sequence at a second pre-determined position of only the first codeword, which by the example of FIG. 2 is appended to the end of the codeword as indicated by reference number 240. The Node B then transmits at block 514 the first and second codewords as modified by blocks 510 and 512.

The indicator being present at the first pre-determined position of both the first and second codewords indicates they are companion to one another. The bit sequence at the second pre-determined position of the first codeword indicates explicitly via the mapping rule the first MCS for the first PRB; the bit sequence maps the first MCS of the mapping rule to the first codeword in which the bit sequence is explicit. The bit sequence at the second pre-determined position of the second codeword indicates implicitly, also via the mapping rule, the second MCS for the second PRB; the bit sequence maps the second MCS of the mapping rule to the second codeword in which the bit sequence is not explicit, but that is companion to the first codeword in which it is explicit.

Figure 6:
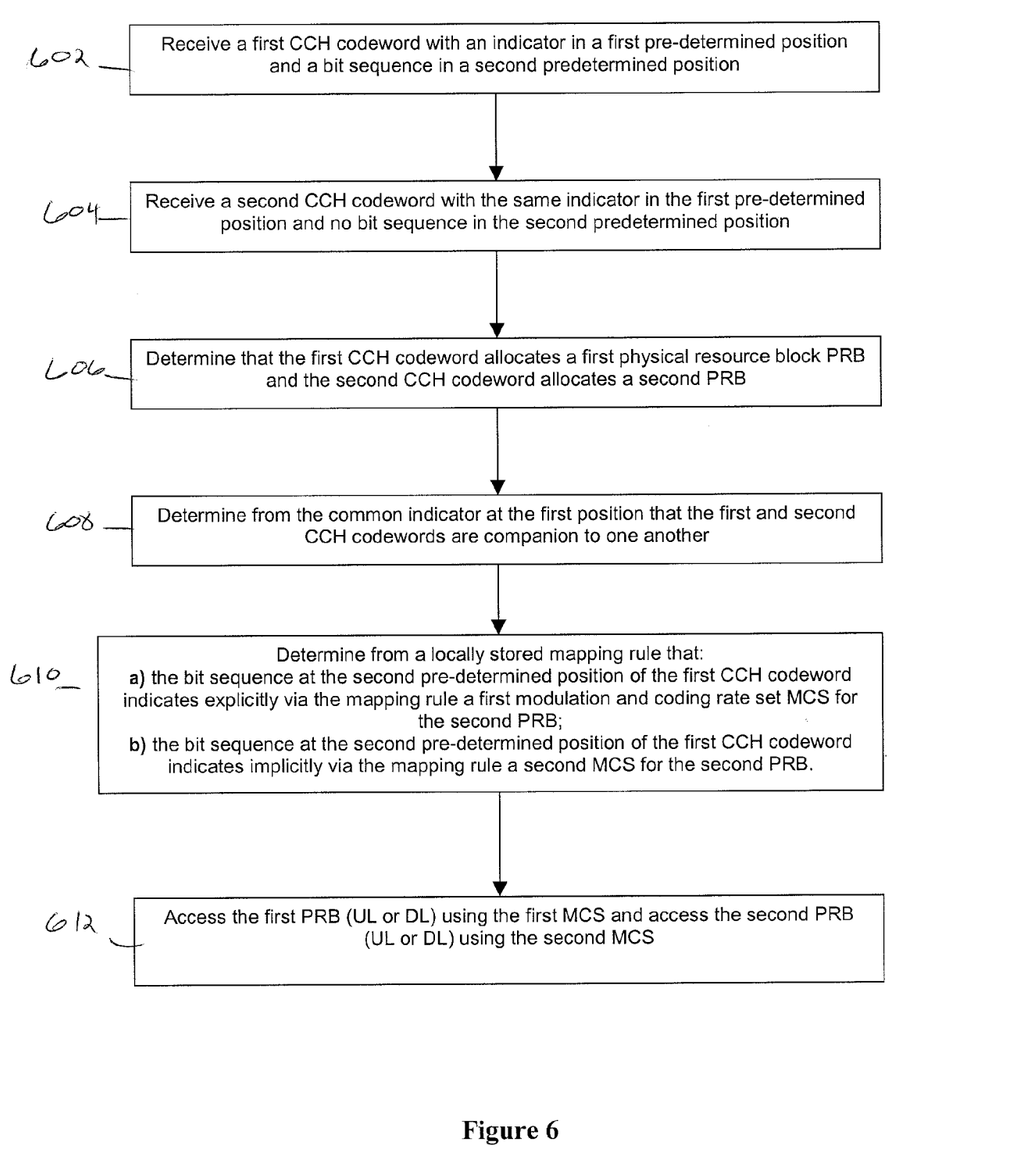
FIG. 6 is another process flow diagram showing embodiments of the invention from the perspective of the party receiving the codewords

The perspective of the party receiving the codewords are detailed by example at FIG. 6 for an embodiment of the invention noted above where a UE receives a resource allocation. With minor modification it can be adapted for the case where the Node B receives CQI, also noted above. At block 602 the mobile user equipment UE receives a first (control channel) codeword with an indicator in a first pre-determined position and a bit sequence in a second predetermined position, At block 604 the HP receives a second codeword with the same indicator in the first pre-determined position and no bit sequence in the second predetermined position, The UE determines at block 606 that the first codeword allocates a first physical resource block PRB and the second codeword allocates a second PRB, and so at block 608 the UE determines from the common indicator at the first position of both the first and second codewords that they are companion to one another, The UE then consults the locally stored mapping rule at block 610 and determines that the bit sequence at the second pre-determined position of the first codeword indicates explicitly via the mapping rule a first modulation and coding rate set MCS for the first PRB, and that the bit sequence at the second pre-determined position of the first codeword indicates implicitly via the mapping rule a second MCS for the second PRB, The UE then at block 612 accesses the first PRB using the first MCS and accesses the second PRB using the second MCS. Since either PRB may be uplink UL or downlink DL, accessing means, in the case of DL, tuning the receiver and receiving on the allocated DL PRB. Similarly, accessing in the case of UL means tuning the transmitter and transmitting on the UL PRB.

As will be appreciated, the various process steps at FIGS. 5-6 are exemplary and even for the particular embodiment detailed several of the process steps may be changed as to the order shown in those figures without departing from these teachings. Further, certain embodiments may use certain of those detailed process steps but dispense with others, and may supplement retained ones of those process steps with additional comparisons, determinations, actions and the like without departing from these teachings.

Note that certain of the above description, and especially FIGS. 4-6, may be viewed as method steps and/or as operations that result from operation of computer program code. Certain of the above embodiments/implementations can be combined with one another.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, message flow diagrams, or by using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other wireless communication systems.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

We claim:

1. A method comprising:
   determining by at least one processor a first parameter that indicates a first modulation and coding rate set for a first shared channel codeword and a second parameter that indicates a second modulation and coding rate set for a second shared channel codeword;
   determining by the at least one processor from a locally stored mapping rule a bit sequence that explicitly indicates the first parameter and that implicitly indicates the second parameter; and
   sending from a transmitter a first control channel codeword with the bit sequence that explicitly indicates the first parameter for the first shared channel codeword and sending from the transmitter a second control channel codeword companion to the first control channel codeword, wherein the second parameter for the second shared channel codeword is implicitly indicated by the bit sequence that is explicit in the first codeword.

2. The method of claim 1, wherein the second control channel codeword is shorter than the first control channel codeword.

3. The method of claim 1, wherein the first parameter is a first channel quality indicator sent on an uplink and the second parameter is a second channel quality indicator sent on the uplink.

4. The method of claim 1, wherein the first shared channel codeword and the second shared channel codeword are received on different streams.

5. The method according to claim 1, wherein the first control channel codeword and the second control channel codeword are sent together.

6. The method according to claim 1, wherein the first control channel codeword and the second control channel codeword are sent in a same symbol.

7. A memory embodying a program of machine-readable instructions executable by a digital data processor to perform actions directed toward sending codewords, the actions comprising:
- determining a first parameter that indicates a first modulation and coding rate set for a first shared channel codeword and a second parameter that indicates a second modulation and coding rate set for a second shared channel codeword;
- determining from a locally stored mapping rule a bit sequence that explicitly indicates the first parameter and that implicitly indicates the second parameter;
- sending a first control channel codeword with the bit sequence that explicitly indicates the first parameter for the first shared channel codeword and sending a second control channel codeword companion to the first control channel codeword, wherein the second parameter for the second shared channel codeword is implicitly indicated by the bit sequence that is explicit in the first control channel codeword.

8. An apparatus comprising:
- a processor configured to determine a first parameter that indicates a first modulation and coding rate set for a first shared channel codeword and a second parameter that indicates a second modulation and coding rate set for a second shared channel codeword;
- a memory configured to store a mapping rule that maps a bit sequence that explicitly indicates a first parameter to a second parameter, and the processor configured to determine the bit sequence from the memory based on the determined first and second parameters; and
- a transmitter configured to send a first control channel codeword with the bit sequence that explicitly indicates the first parameter for the first shared channel codeword, and to send a second control channel codeword companion to the first control channel codeword, wherein the second parameter for the second shared channel codeword is implicitly indicated by the bit sequence that is explicit in the first control channel codeword.

9. The apparatus of claim 8, wherein the second control channel codeword is shorter than the first control channel codeword.

10. The apparatus of claim 8, wherein the first parameter is a first channel quality indicator sent on an uplink and the second parameter is a second channel quality indicator sent on the uplink and the apparatus comprises a mobile user equipment.

11. The apparatus of claim 8, wherein the transmitter is configured to send the first control channel codeword and the second control channel codeword together.

12. A method comprising:
- receiving at a receiver a first control channel codeword that comprises a bit sequence in a predetermined position;
- receiving at the receiver a second control channel codeword companion to the first control channel codeword that does not have a bit sequence in the predetermined position; and
- determining from at least one processor using a locally stored mapping rule that the bit sequence explicitly indicates a first parameter that indicates a first modulation and coding rate set for a first shared channel codeword, and that the bit sequence implicitly indicates a second parameter that indicates a second modulation and coding rate set for a second shared channel codeword.

13. The method of claim 12, wherein:
the first modulation and coding rate set is for a first physical resource block and the second modulation and coding rate set is for a second physical resource block.

14. The method of claim 12, wherein the first parameter is a first channel quality indicator received on an uplink and relating to the first shared channel codeword, and the second parameter is a second channel quality indicator received on the uplink and relating to the second shared channel codeword.

15. The method according to claim 12, wherein the first control channel codeword and the second control channel codeword are received together.

16. The method according to claim 12, wherein the first control channel codeword and the second control channel codeword are received in a same symbol.

17. An apparatus comprising:
- a receiver configured to receive a first control channel codeword that comprises a bit sequence in a predetermined position and to receive a second control channel codeword companion to the first control channel codeword that does not have a bit sequence in the predetermined position;
- a memory configured to store a mapping rule associating the bit sequence to a first parameter that indicates a first modulation and coding rate set and to a second parameter that indicates a second modulation and coding rate set; and
- a processor configured to determine from the mapping rule that the bit sequence explicitly indicates the first parameter for a first shared channel codeword, and that the bit sequence implicitly indicates the second parameter for a second shared channel codeword.

18. The apparatus of claim 17, wherein:
the first modulation and coding rate set is for a first physical resource block and the second modulation and coding rate set is for a second physical resource block.

19. The apparatus of claim 17, wherein the first parameter is a first channel quality indicator received on an uplink and relating to the first shared channel codeword and the second parameter is a second channel quality indicator received on the uplink and relating to the second shared channel codeword;
and wherein the apparatus comprises a Node B.

20. The apparatus of claim 17, wherein the first control channel codeword and the second control channel codeword are received together.

* * * * *